(12) United States Patent
Kemp et al.

(10) Patent No.: US 9,768,694 B2
(45) Date of Patent: *Sep. 19, 2017

(54) INTRINSICALLY SAFE VOLTAGE LIMITING SHUNT REGULATOR CIRCUIT

(71) Applicant: FISHER CONTROLS INTERNATIONAL LLC, Marshalltown, IA (US)

(72) Inventors: Matthew J. Kemp, Marshalltown, IA (US); Davin S. Nicholas, Marshalltown, IA (US); Stephen G. Seberger, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/084,821

(22) Filed: Mar. 30, 2016

(65) Prior Publication Data

US 2016/0211752 A1    Jul. 21, 2016

Related U.S. Application Data

(63) Continuation of application No. 14/045,323, filed on Oct. 3, 2013, now Pat. No. 9,343,899.

(51) Int. Cl.
*H02H 9/04* (2006.01)
*H02M 3/158* (2006.01)
(Continued)

(52) U.S. Cl.
CPC ............ *H02M 3/158* (2013.01); *H02H 9/008* (2013.01); *H02H 9/041* (2013.01); *H02H 9/045* (2013.01);
(Continued)

(58) Field of Classification Search
CPC ................................ H02H 9/04; H02H 9/041
(Continued)

(56) References Cited

U.S. PATENT DOCUMENTS 3,684,924 A    8/1972  Miller, Jr.
4,024,449 A    5/1977  Burrie et al.
(Continued)

FOREIGN PATENT DOCUMENTS

DE    3614589 A1    11/1987
DE    19811269 C1    10/1999
GB    1470270 A    4/1977

OTHER PUBLICATIONS

International Preliminary Report on Patentability issued in PCT/US2014/058939 dated Apr. 5, 2016.
(Continued)

*Primary Examiner* — Dharti Patel
(74) *Attorney, Agent, or Firm* — Marshall, Gerstein & Borun LLP

(57) ABSTRACT

An intrinsically safe redundant regulator circuit includes a plurality of voltage limiting regulators between a regulated rail and a ground rail. Each of the plurality of voltage limiting regulators includes: (i) a shunt regulator component configured to clamp a voltage across the regulated rail and the ground rail to a safety clamp voltage value; and (ii) one or more components, where a property of each of the one or more components is selected to configure the safety clamp voltage value.

22 Claims, 6 Drawing Sheets

(51) Int. Cl.
  *H02H 9/00* (2006.01)
  *H02M 1/32* (2007.01)
(52) U.S. Cl.
  CPC .............. *H02M 1/32* (2013.01); *H02H 9/042* (2013.01); *H02H 9/043* (2013.01)
(58) Field of Classification Search
  USPC .......................................................... 361/56
  See application file for complete search history.

(56) References Cited

U.S. PATENT DOCUMENTS

| | | | |
|---|---|---|---|
| 4,264,988 A | 5/1981 | Specht | |
| 5,050,060 A | 9/1991 | Geuns | |
| 5,091,818 A | 2/1992 | Morikawa et al. | |
| 5,365,420 A | 11/1994 | Cadman | |
| 5,835,534 A | 11/1998 | Kogure | |
| 6,088,209 A | 7/2000 | Sink | |
| 7,715,159 B2 | 5/2010 | Bazzano et al. | |
| 8,091,818 B2 * | 1/2012 | Stemper | B02C 2/04 241/207 |
| 9,343,899 B2 * | 5/2016 | Kemp | H02H 9/045 |
| 2002/0153571 A1 | 10/2002 | Mergens et al. | |
| 2015/0098158 A1 | 4/2015 | Kemp et al. | |
| 2015/0146332 A1 | 5/2015 | Seberger | |

OTHER PUBLICATIONS

IEC 60079-11 Ed. 6.0: Explosive atmospheres Part 1: Equipment protection by intrinsic safety "i" Final Draft International Standard Projet final De Norme Internationale 31G/207/FDIS.
Low voltage adjustable precision shunt regulators TLVH431 family Rev. Apr. 1-27, 2012 http://www.nxp.com/documents/data_sheet/TLVH431_FAM.pdf.
Programmable shunt voltage reference TLVH431 Rev Jun. 1, 2012 http://www.st.com/web/en/resource/technical/document/datasheet/DM00057412.pdf.
Low-Voltage Adjustable Precision Shunt Regulators, TLVH431, TLVH431A, TLVH431B, TLVH432, TLVH432A, TLVH432B SLVS5551—Nov. 2004—revised Sep. 2009 http://www.ti.com/lit/ds/symlink/tlvh432.pdf.
International Search Report issued in PCT/US2014/058939 dated Jan. 8, 2015.
Written Opinion issued in PCT/US2014/058939 dated Jan. 8, 2015.

* cited by examiner

INTRINSICALLY SAFE VOLTAGE LIMITING SHUNT REGULATOR CIRCUIT

FIELD OF THE DISCLOSURE

The present disclosure is directed to intrinsically safe device circuitry and, more particularly, to an intrinsically safe voltage limiting shunt regulator circuit for devices in hazardous environments.

BACKGROUND

Some industrial processes, such as those in the petroleum industry, require devices to operate in hazardous atmospheres or other dangerous conditions. Such devices are often governed by a standard of "intrinsic safety", such as the ISA-60079-11 standard, specifying certain conditions for devices in hazardous atmospheres. The conditions seek to either limit the amount of energy stored in device circuitry (e.g., by limiting voltages across capacitors or currents through inductors) or limit the discharge of accumulated energy (e.g., by restricting the spacing of components) such that a discharge of energy will not cause an ignition. In the case of the ISA-60079-11 standard, certain attributes of a device can be considered "infallible" if certain conditions, prescribed in the standard, are met. Generally, the circuitry of a device is considered "Intrinsically safe" if the circuitry remains safe with up to two "countable" faults.

Commonly, device circuits use Zener diodes as shunt voltage limiters to limit the voltage that could reach certain device components. However, while effective at such voltage limiting, Zener diodes must be operated at a voltage well below the Zener voltage to prevent leakage of current near the Zener voltage. In power sensitive applications (e.g., instruments powered by 4-20 mA signals), such current leakage is a significant concern. On the other hand, if a higher-voltage Zener diode is properly specified to prevent current leakage, the voltage limit increases, which may cause issues with respect to intrinsic safety.

SUMMARY

An intrinsically safe process control device comprises: a regulated rail, a ground rail, and a device component electrically coupled to both the regulated rail and the ground rail, wherein a voltage applied across the regulated rail and the ground rail causes energy to be stored in the device component. Further, the intrinsically safe process control device includes three or more voltage limiting regulators, each voltage limiting regulator disposed in parallel with the device component and each voltage limiting regulator including: a shunt regulator component configured to clamp the voltage across the regulated rail and the ground rail to a safety clamp voltage value, and one or more components, wherein a property of the one or more components is selected to configure the safety clamp voltage value.

An intrinsically safe redundant regulator circuit comprises: a plurality of voltage limiting regulators between a regulated rail and a ground rail. Each of the plurality of voltage limiting regulators includes: a shunt regulator component configured to clamp a voltage across the regulated rail and the ground rail to a safety clamp voltage value, and one or more components, wherein a property of the one or more components is selected to configure the safety clamp voltage value.

DETAILED DESCRIPTION

The present disclosure is directed to a redundant regulator circuit for an intrinsically safe process control device such as a switch, solenoid, or transmitter, for example, and, specifically, to regulating voltages across intrinsically safe process control device components via the redundant regulator circuit. In particular, a redundant regulator circuit according to the present disclosure allows a process control device to operate at or near a safety clamp voltage of a shunt voltage limiter while, at the same time, qualifying as an "infallible" shunt voltage limiter.

Figure 1:
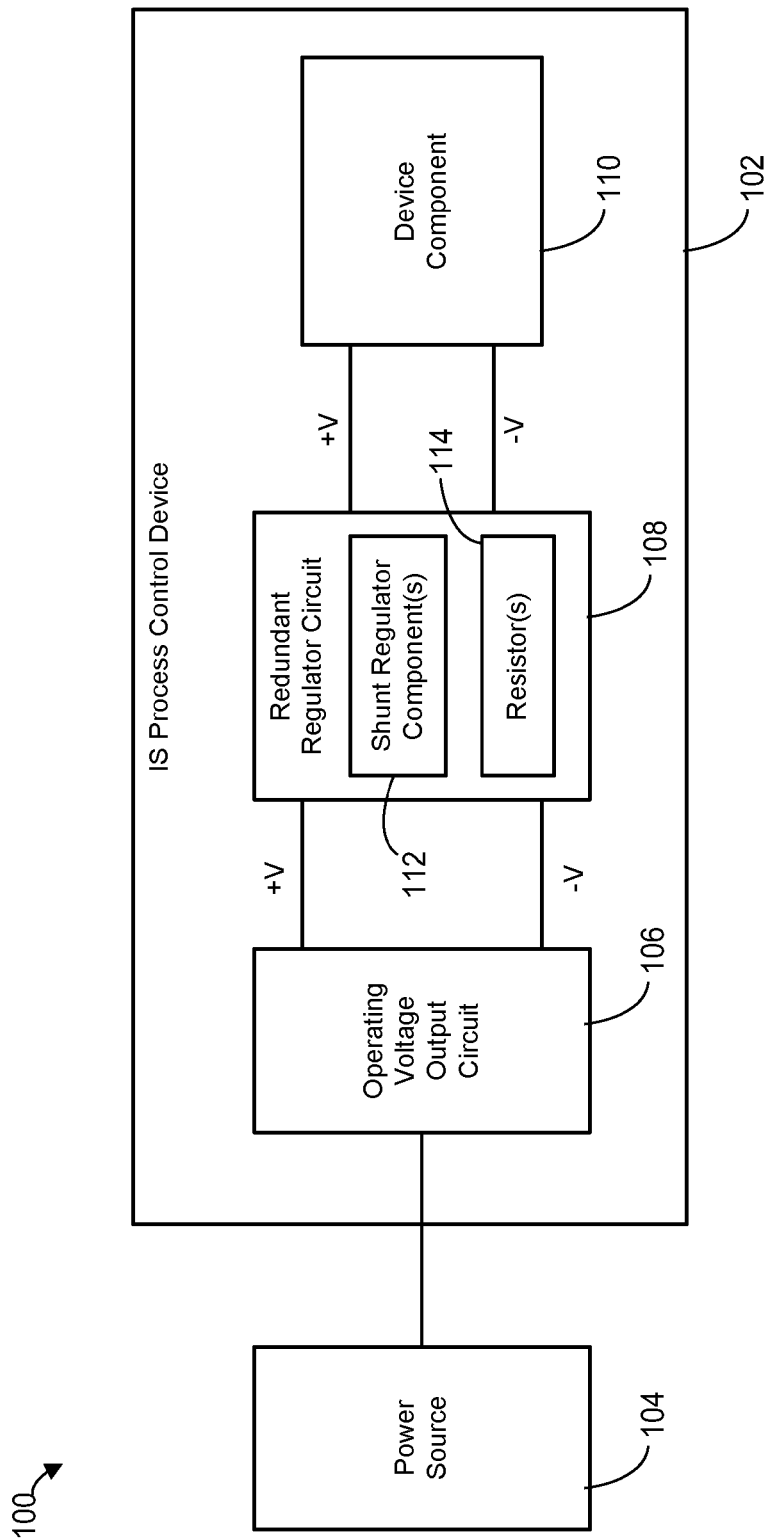
FIG. 1 is a block diagram that illustrates an example system including an intrinsically safe process control device implementing a redundant regulator circuit.

Referring now to FIG. 1, an example system 100 constructed in accordance with one version of the present disclosure includes an intrinsically safe (IS) process control device 102 powered by a power source 104. The IS process control device 102 may include a switch, transmitter, thermocouple, solenoid valve, etc. Further, the IS process control device 102 may be part of a manufacturing plant, oil or gas extraction structure, refinery, HVAC (heating, ventilation, and air conditioning) system, etc. in which the IS process control device 102 is exposed to a hazardous environment, such as an environment with hazardous gases, chemicals, vapors, dusts, fibers, etc.

The power source 104 provides power to various components, including to some circuits or components such as an operating voltage output circuit 106 that provide operating voltages for other circuits or components. For example, the power source 104 may provide power to the operating voltage output circuit 106, which may output positive and negative voltages that are, in turn, applied to the rails of a redundant regulator circuit 108 and a device component 110. The positive and negative voltages are denoted in FIG. 1 as +V and −V, respectively, but it is understood that a positive voltage may be applied to one of the rails of the redundant regulator circuit 108 and the device component 110 and the other of the rails may be grounded.

The power source 104 may include a power supply coupled to mains power, for example, where the mains power is coupled to the IS process control device 102 via an alternating current (AC) adapter, or the power source 104 may include a power supply coupled to battery power source (in which case it may be disposed inside the IS process control device 102). The power source 104 may, in some cases, be electrically coupled to an operating voltage output circuit 106, such as a power supply or regulator circuit, that may transform a power signal (e.g., 24V) to particular voltages (e.g., ±3.3V, ±10V), where the particular voltages can be applied across rails of the redundant regulator circuit 108 and the device component 110.

The IS process control device 102 may be qualified as intrinsically safe given certain associated entity parameters, in an implementation. With this type of entity qualification, the IS process control device 102 may qualify as intrinsically safe provided that other devices to which the IS process control device 102 is connected meet a corresponding set of entity parameters. A plant may then include multiple other devices attached to the IS process control device 102 and still maintain intrinsic safety, provided that the multiple other devices (e.g., in all considered combinations and fault scenarios) are compatible with the set of entity parameters corresponding to the IS process control device 102.

By way of example, entity parameters corresponding to the IS process control device 102 may include a maximum allowed voltage, a maximum allowed current, an internal capacitance, an internal inductance, a maximum unprotected capacitance/inductance, an inductance/capacitance of interconnecting wiring, or a maximum power. In one scenario, the entity parameters may include a maximum allowed voltage of 30V, a maximum allowed current value of 130 mA, and a maximum allowed power value of 1 W, for example.

The device component 110 may include an energy storing device component 110, such as a capacitor or inductor or any device having internal capacitance or inductance. The voltage applied across the device component 110 may be regulated by the redundant regulator circuit 108 in parallel with the device component 110, in some implementations. In this manner, the energy stored in the device component 110, or a potential energy associated with an energy discharge, is limited, and the IS process control device 102 may be qualified as intrinsically safe (e.g., under the ISA-60079-11 standard). The redundant regulator circuit 108 may include one or more shunt regulator components 112, such as low-voltage 3-terminal adjustable voltage references, and one or more resistors 114 configured such that the redundant regulator circuit is an "infallible" shunt voltage limiter, for example. Further details of the redundant regulator circuit 108 are discussed with reference to FIG. 4, FIG. 5, and FIG. 6.

Figure 2:
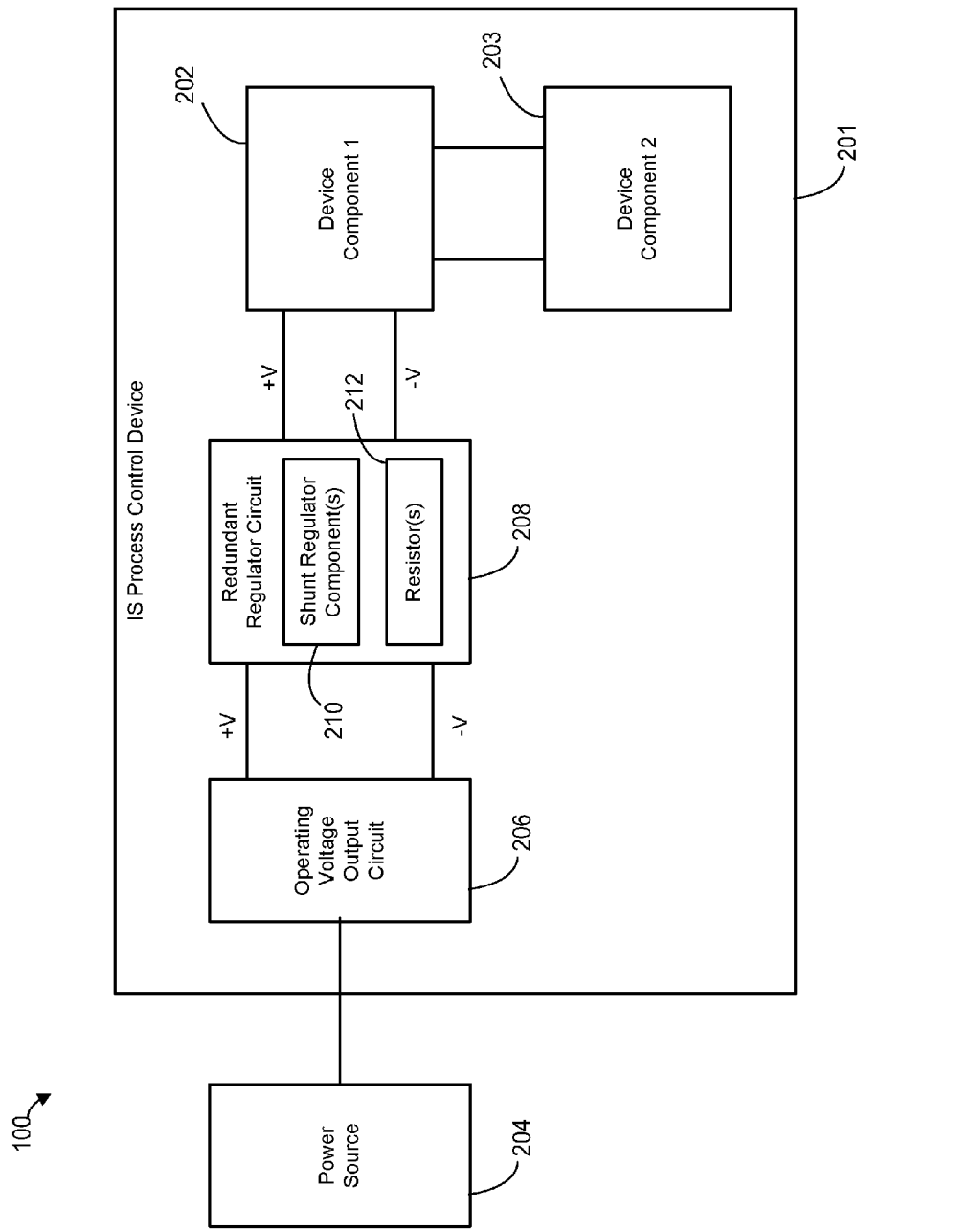
FIG. 2 is a block diagram that illustrates another example system including an intrinsically safe process control device implementing multiple device components connected in parallel with a redundant regulator circuit.

Although the example system 100 includes one IS process control device 102, one redundant regulator circuit 108, one operating voltage output circuit 106, and one device component 110, a power source 104 may supply power to any number of IS process control devices with any number of redundant regulator circuits, device components, and operating voltage output circuits. For example, FIG. 2 illustrates an example system 200 including an IS process control device 201 implementing multiple device components 202 and 203.

Similar to the system 100, the system 200 includes a power source 204, an operating voltage output circuit 206, and a redundant regulator circuit 208, where the redundant regulator circuit 208 includes one or more shunt regulator components 210 and one or more resistors 212, in an implementation. However, in contrast to the system 100, the system 200 includes two device components 202 and 203 operatively connected in parallel with the redundant regulator circuit 208. The device components 202 and 203 may include two capacitors or two inductors, for example.

In general, an IS process control device may include any suitable number of energy storing components connected in parallel with a redundant regulator circuit. However, it is understood that an IS process control device may also include multiple redundant regulators. For example, an IS process control device may include two redundant regulator circuits, where each of the redundant regulator circuits is operatively connected to a respective one of two device components. Further, multiple redundant regulator circuits may be operatively connected to multiple operating voltage output circuits allowing an IS process control device to supply differing voltages to device components.

Figure 3:
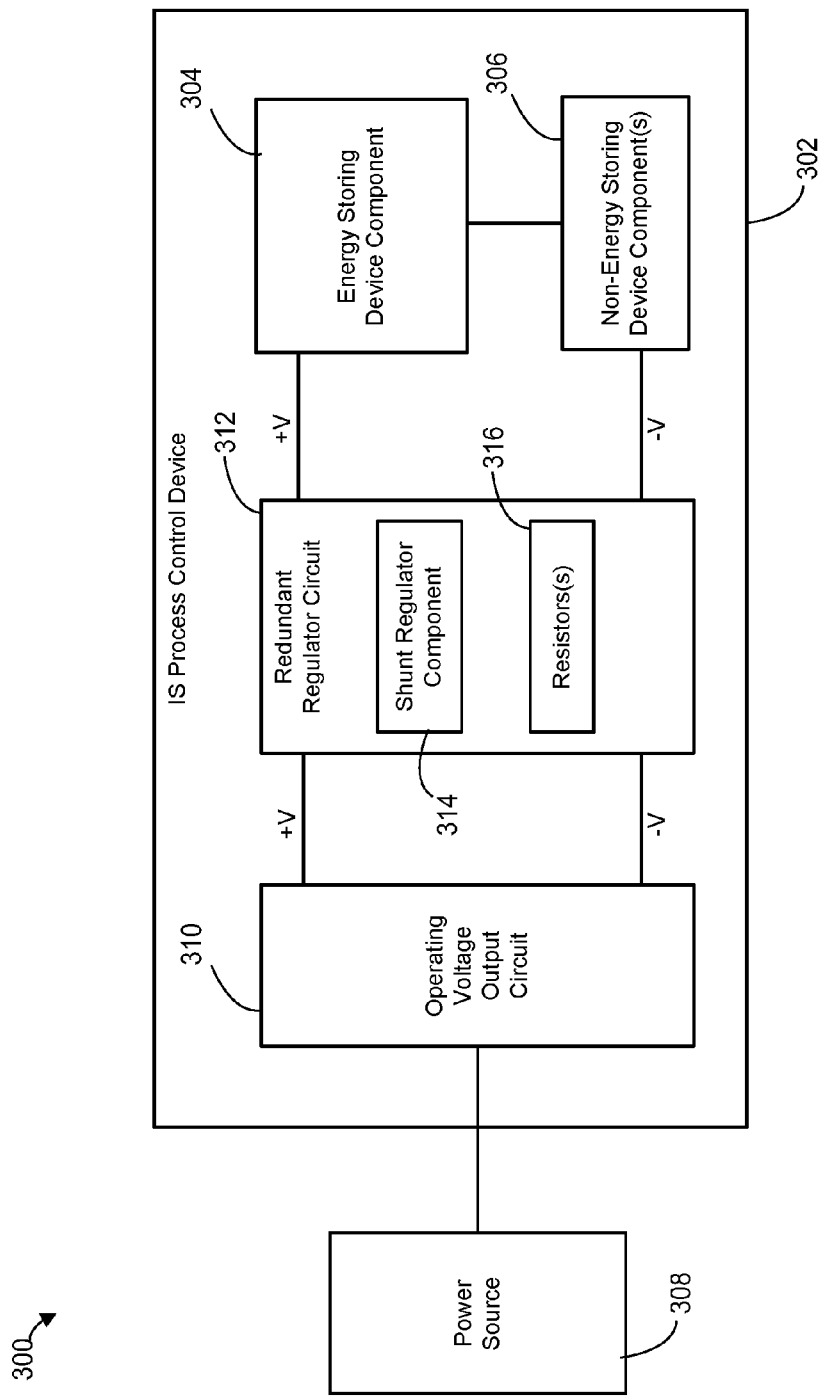
FIG. 3 is a block diagram that illustrates yet another example system including an intrinsically safe process control device implementing both energy-storing and non-energy storing components connected in parallel with a redundant regulator circuit.

FIG. 3 illustrates another example system 300 in which an IS process control device 302 includes an energy storing device component 304 and non-energy storing device components 306. Again, the IS process control device 302 is powered by a power source 308 and includes an operating voltage output circuit 310. However, in this example implementation, a redundant regulator circuit (e.g., including one or more shunt regulator components 314 and one or more resistors 316) limits the voltage applied to both the energy storing device component 304 and non-energy storing device components 306. The energy storing device component may include a capacitor or inductor and the non-energy storing device components 306 may include a variety of resistors. Generally speaking, an IS process control device may include any number and combination of energy-storing and non-energy storing device components in parallel with a redundant regulator circuit.

Figure 4:
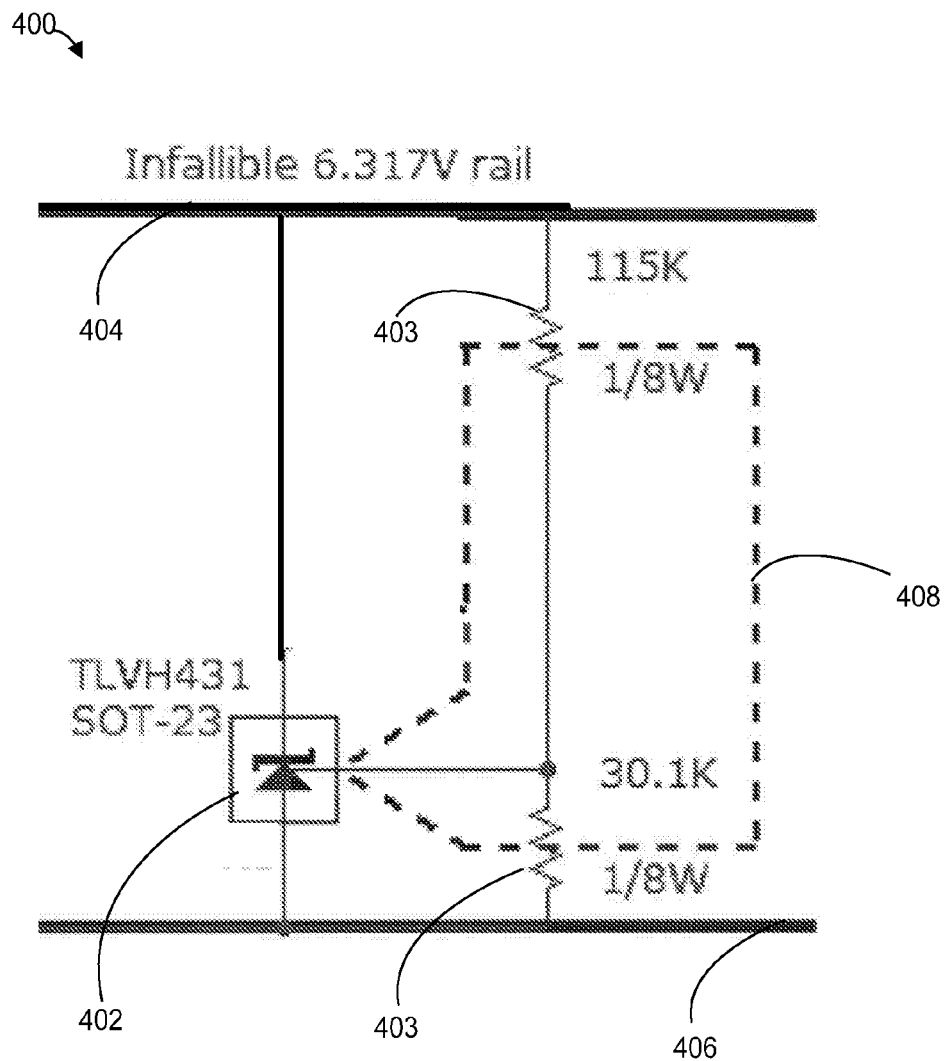
FIG. 4 illustrates an example circuit which can be implemented as part of one of the redundant regulator circuits illustrated in FIGS. 1-3.

Referring now to FIG. 4, an example circuit 400, which may be part of a redundant regulator circuit, includes a shunt regulator component 402 and one or more resistors 403. In some implementations, a plurality of copies of the example circuit 400 may be connected in parallel to create an "infallible" voltage limiting shunt regulator. For example, three copies of the circuit 400 may be connected in parallel such that the resulting "redundant" combination limits voltage to a parallel connected device component even when two of the copies of the circuit 400 fail. An example redundant regulator circuit is further discussed with reference to FIG. 6.

The shunt regulator component 402 of the example circuit 400 is connected between a regulated rail 404 and a ground rail 406 and clamps a voltage applied across the regulated rail 404 and the ground rail 406 to a safety clamp voltage value, in an implementation. For example, the shunt regulator component 402 may be an integrated circuit (IC) configured as an adjustable voltage reference. Further, one or more components, such as the resistors 403 may set the safety clamp voltage value, in an implementation. The shunt regulator component 402 combined with the resistors 403 may clamp the voltage across the regulated rail 404 and the ground rail 406 to a magnitude of 6.317V. In this manner, the circuit 400 may limit the voltage applied to a device component, such as a capacitor connected in parallel with the circuit 400, even when an applied voltage is greater than 6.317V. Although, the resistors 403 are illustrated in FIG. 4 as components whose resistance may be selected to configure the safety clamp voltage, it is understood that any suitable components or combination of components may be utilized to set the safety clamp voltage (e.g., by selecting properties of the components). For example, the resistance of a single resistor may be selected to configure the safety clamp voltage, in some embodiments.

As will be appreciated, the components of a redundant regulator circuit, such as the shunt regulator component 402 and the resistors 403, may each have corresponding tolerance values. The resistors 403, for example, may have associated resistance values (e.g., in Ohms) within a certain tolerance, such as a tolerance of five percent or one percent. In addition, sections of the redundant regulator circuit, such as redundant voltage limiting regulator sections, may each have a tolerance stackup based on the components in the respective sections. Thus the safety clamp voltage of each of a plurality of voltage limiting regulator sections may have a corresponding high value (at the top of the tolerance stackup), low value (at the bottom of the tolerance stackup), and nominal or average value (in the middle of the tolerance stackup).

In some implementations, the shunt regulator component 402 and the resistors 403 may be physically positioned on a circuit board so as to meet the infallible connection requirements of an intrinsically safe standard. For example, the dotted lines 408 may represent "countable" spacings of the shunt regulator component 402 with respect to the resistors 403. Such countable spacings may ensure that failure of a space must be counted as a fault in the analysis of the circuit 400 for the double-fault tolerance required for intrinsic safety of the circuit 400.

Although FIG. 4 illustrates the example circuit 400 that may be included as a redundant component in a redundant regulator circuit, entity parameters associated with certain IS process control devices may necessitate further power sharing, power limiting, or amplification components. If an entity parameter specifies a maximum power above the power rating of the shunt regulator component 402, for example, a power sharing resistor may be included in the circuit 400 to prevent the shunt regulator component 402 from exceeding a corresponding power rating.

Figure 5:
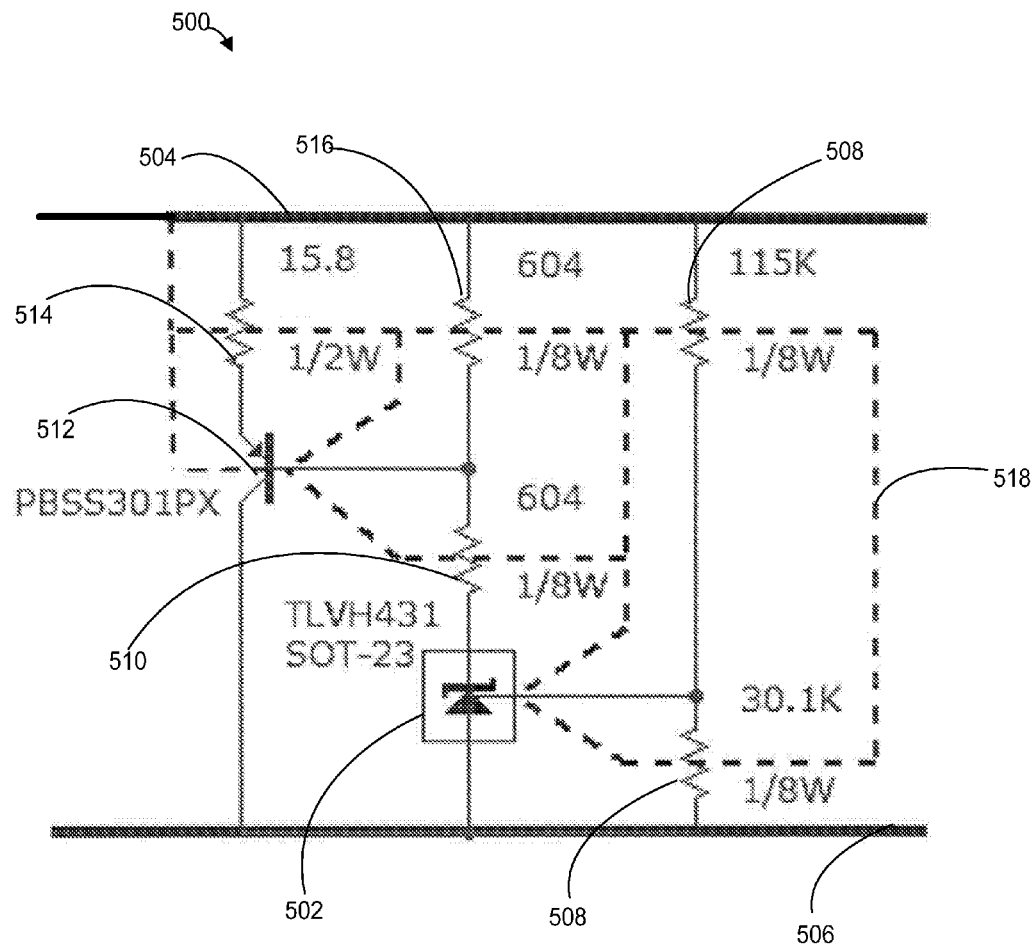
FIG. 5 illustrates another example circuit which can be implemented as part of one of the redundant regulator circuits illustrated in FIGS. 1-3.

FIG. 5 illustrates an example circuit 500, which may be part of a redundant regulator circuit, including power sharing/limiting and amplification components. In one implementation, the circuit 500 includes a shunt regulator component 502 capable of clamping a voltage across a regulated rail 504 and a ground rail 506 to a safety clamp voltage value, where the safety clamp voltage value is set by the resistances of one or more resistors 508. Further, the power dissipated across the shunt regulator component 502 is limited by a power limiting resistor 510. For example, a maximum power entity parameter of an IS process control device may exceed the power rating of the shunt regulator component 502, and the resistance of the power limiting resistor 510 may be selected to limit the power dissipated across the shunt regulator component 502 to a value well below the power rating of the shunt regulator component 502.

The example circuit 500 may also include a transistor component 512 and a corresponding power sharing resistor 514 to limit the power dissipated across the transistor component 512. In some scenarios, the transistor component 512 may aid the clamping of voltages by amplifying the current drawn from the regulated rail 504. For example, depending on the entity parameters associated with an IS process control device (e.g., in which the circuit 500 is installed), the transistor component 512 may or may not draw excess current away from the regulated rail 504 and prevent the accumulation of energy in device components, such as inductors. The example circuit 500 also includes a managing resistor 516 operatively connected to the transistor component 512. The managing resistor 516 may selectively prevent activation of the transistor component 512 based on an applied voltage across the regulated rail 504 and the ground rail 506 and the current drawn by the shunt regulator component 502. In this manner, the transistor component 512 may amplify current when the applied voltage is above a threshold while the managing resistor 516 ensures that the transistor component 512 is turned off when current shunting is not required, thereby preventing current leakage.

Similar to the example circuit 400, the components of the circuit 500 may be physically spaced such that the circuit 500 adheres to countable spacing standards. Such spaces of device components are represented in FIG. 5 with one or more dotted lines 518.

Figure 6:
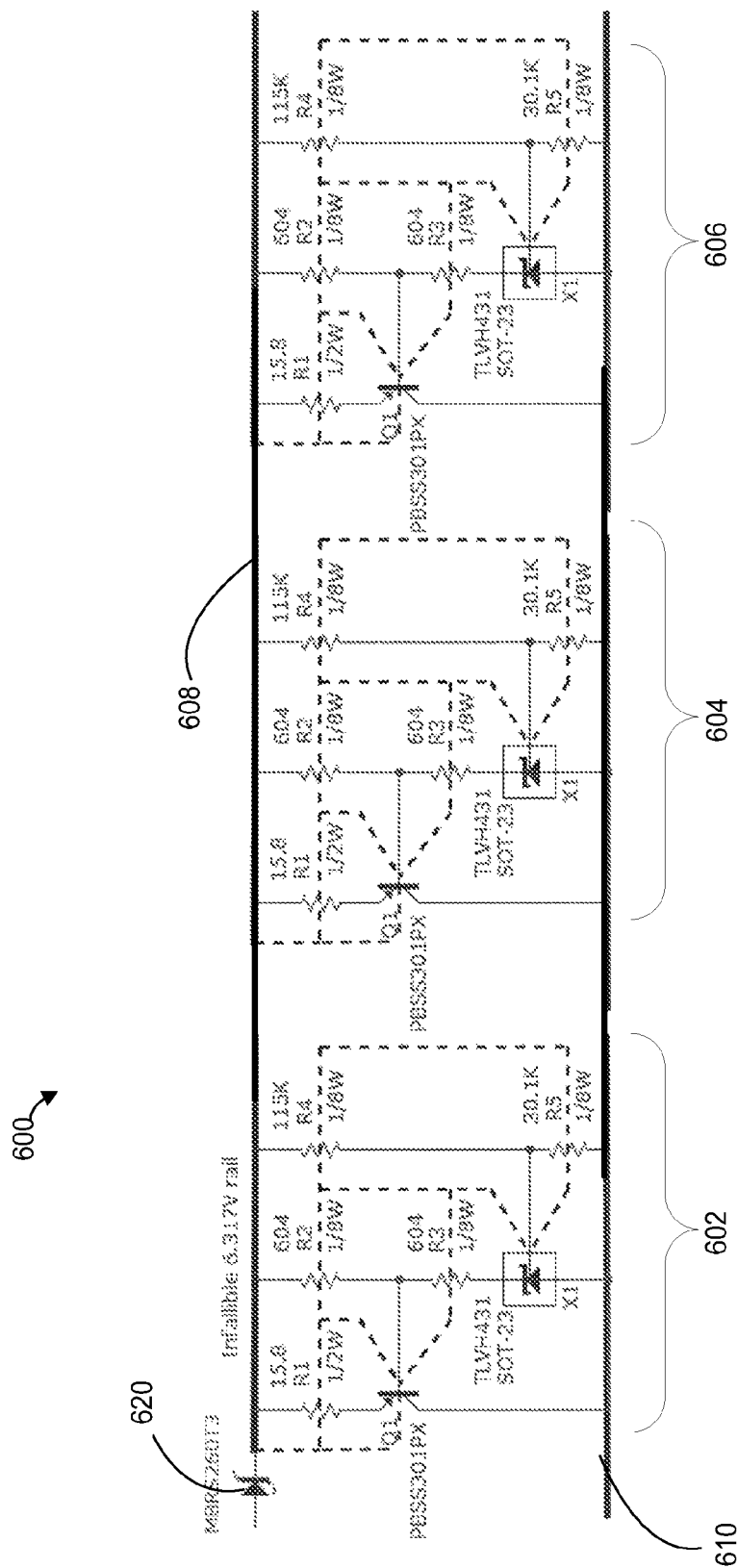
FIG. 6 illustrates an example redundant regulator circuit which can be implemented as the redundant regulator circuit illustrated in FIGS. 1-3.

In some implementations, a plurality of voltage limiting shunt regulator circuits, such as the circuit 400 or the circuit 500, may be connected in parallel such that an "infallible" voltage-limiting assembly is formed. Such a circuit adheres to an intrinsically safe standard requiring safety with two or more circuit faults (e.g., "countable" faults of the ISA-60079-11 standard). FIG. 6 illustrates such a "triply redundant" regulator circuit 600 including three voltage limiting shunt regulators (voltage limiting regulators 602, 604, and 606) similar to the circuit 500. The triply redundant regulator circuit 600 may be implemented as one of the redundant regulator circuits 108, 208, or 312, for example.

The triply redundant regulator circuit 600 may be considered infallible because two of the voltage limiting shunt regulators 602, 604, and 606 may fail while the other of the three voltage limiting shunt regulators 602, 604, and 606 may continue to safely clamp the voltage across a regulated rail 608 and a ground rail 610. In one scenario, the voltage limiting regulators 602 and 604 may fail (e.g., due to component malfunction or damage) while the voltage limiting regulator 606 remains intact and functional.

Because each of the voltage limiting regulators may compete to clamp the voltage across the regulated rail 608 and the ground rail 610 if each is set to the same clamping voltage, the circuit 600 may have the potential to oscillate. Therefore, in some implementations, the safety clamp voltage of one of the voltage limiting shunt regulators 602, 604, and 606 may be set lower than the safety clamp voltage of the other two voltage limiting shunt regulators 602, 604, and 606. For example, the highest safety clamp voltage value of a tolerance stackup corresponding to the voltage limiting shunt regulator 602 may be set lower than the lowest safety clamp voltage values of tolerance stackups corresponding to the voltage limiting shunt regulators 604 and 606. In this manner, only one of the voltage limiting shunt regulators 602, 604, and 606 will clamp the voltage across the regulated rail 608 and the ground rail 610 during normal operation.

In addition to the components illustrated in FIG. 6, a redundant regulator circuit may include various other non-redundant components allowing the circuit to comply with intrinsically safe standards. For example, the circuit 600 may include a non-redundant power rectifier 620 to prevent energy storage in a case of reversed polarity of an input signal.

What is claimed is:
1. An intrinsically safe process control device comprising:
   a regulated rail;
   a ground rail;
   a device component electrically coupled to both the regulated rail and the ground rail, wherein a voltage applied across the regulated rail and the ground rail causes energy to be stored in the device component; and three or more voltage limiting regulators, each voltage limiting regulator disposed in parallel with the device component and each voltage limiting regulator including:
 a shunt regulator component configured to clamp the voltage across the regulated rail and the ground rail to a safety clamp voltage value,
 one or more components, wherein a property of the one or more components is selected to configure the safety clamp voltage value, and
 a power sharing resistor configured to (i) limit the power dissipated across a transistor component configured to amplify a current from the regulated rail, or (ii) prevent the shunt regulator component from exceeding a corresponding power rating.

2. The intrinsically safe process control device of claim 1, wherein each of the three or more voltage limiting regulators further includes:
 a power limiting resistor configured to limit the power dissipated across the shunt regulator component.

3. The intrinsically safe process control device of claim 1, wherein each of the three or more voltage limiting regulators further includes:
 a managing resistor configured to prevent the transistor component from amplifying the current from the regulated rail when the voltage across the regulated rail and the ground rail is below a threshold.

4. The intrinsically safe process control device of claim 1, wherein the components of the circuit are physically spaced such that the circuit adheres to countable spacing standards.

5. The intrinsically safe process control device of claim 1, wherein the safety clamp voltage value corresponding to one of the three or more voltage limiting regulators is lower in magnitude than the safety clamp voltage value corresponding to the remaining of the three or more voltage limiting regulators.

6. The intrinsically safe process control device of claim 5, wherein a highest clamp voltage value of a tolerance stackup corresponding to one of the three or more voltage limiting regulators is lower than the lowest clamp voltage value of a tolerance stackup corresponding to the remaining of the three or more voltage limiting regulators.

7. The intrinsically safe process control device of claim 1, wherein the three or more voltage limiting regulators are compatible with a set of entity parameters.

8. The intrinsically safe process control device of claim 7, wherein resistance values of the power limiting resistor, the power sharing resistor, and the managing resistor are based on the set of entity parameters.

9. The intrinsically safe process control device of claim 1, wherein the one or more components includes a resistor and the property of the one or more components includes a resistance of the resistor.

10. The intrinsically safe process control device of claim 1, wherein the one or more components includes a plurality of resistors and the property of the one or more components includes a plurality of resistances each corresponding to a respective one of the plurality of resistors.

11. The intrinsically safe process control device of claim 1, wherein the device includes one or more non-redundant components.

12. The intrinsically safe process control device of claim 11, wherein the one or more non-redundant components include a non-redundant power rectifier configured to prevent energy storage in a case of reversed polarity of an input signal.

13. An intrinsically safe redundant regulator circuit comprising:
 a plurality of voltage limiting regulators between a regulated rail and a ground rail, wherein each of the plurality of voltage limiting regulators includes:
  a shunt regulator component configured to clamp a voltage across the regulated rail and the ground rail to a safety clamp voltage value,
  one or more components, wherein a property of the one or more components is selected to configure the safety clamp voltage value, and
  a power sharing resistor configured to (i) limit the power dissipated across a transistor component configured to amplify a current through the regulated rail, or (ii) prevent the shunt regulator component from exceeding a corresponding power rating.

14. The intrinsically safe redundant regulator circuit of claim 13, wherein each of the plurality of voltage limiting regulators further includes:
 a power limiting resistor configured to limit the power dissipated across the shunt regulator component.

15. The intrinsically safe redundant regulator circuit of claim 13, wherein each of the plurality of voltage limiting regulators further includes:
 a managing resistor configured to prevent the transistor component from amplifying the current from the regulated rail when the voltage across the regulated rail and the ground rail is below a threshold.

16. The intrinsically safe redundant regulator circuit of claim 13, wherein the components of the circuit are physically spaced such that the circuit adheres to countable spacing standards.

17. The intrinsically safe redundant regulator circuit of claim 13, wherein the safety clamp voltage value corresponding to one of the plurality of voltage limiting regulators is lower in magnitude than the safety clamp voltage value corresponding to the remaining of the plurality of voltage limiting regulators.

18. The intrinsically safe redundant regulator circuit of claim 17, wherein a highest clamp voltage value of a tolerance stackup corresponding to one of the plurality of voltage limiting regulators is lower than a lowest clamp voltage value of a tolerance stackup corresponding to the remaining of the plurality of voltage limiting regulators.

19. The intrinsically safe redundant regulator circuit of claim 13, wherein the plurality of voltage limiting regulators are configured according to a set of entity parameters.

20. The intrinsically safe redundant regulator circuit of claim 19, wherein resistance values of the power limiting resistor, the power sharing resistor, and the managing resistor are based on the set of entity parameters.

21. The intrinsically safe redundant regulator circuit of claim 13, wherein the plurality of voltage limiting regulators includes at least three voltage limiting regulators.

22. The intrinsically safe redundant regulator circuit of claim 13, wherein the one or more components includes a resistor and the property of the one or more components includes a resistance of the resistor.

* * * * *